United States Patent [19]

Speranza

[11] Patent Number: 4,852,006
[45] Date of Patent: Jul. 25, 1989

[54] AMT OFF-HIGHWAY DOWNSHIFT LOGIC

[75] Inventor: Donald Speranza, Canton, Mich.

[73] Assignee: Eaton Corporation, Cleveland, Ohio

[21] Appl. No.: 182,608

[22] Filed: Apr. 18, 1988

[51] Int. Cl.$^4$ .................. B60K 41/18; G06F 15/20
[52] U.S. Cl. .................................. 364/424.1; 74/866
[58] Field of Search ............ 74/866; 192/0.076, 0.092, 192/0.09; 364/424.1

[56] References Cited

U.S. PATENT DOCUMENTS

| | | | |
|---|---|---|---|
| 4,081,065 | 3/1978 | Smyth et al. | 192/0.076 |
| 4,226,295 | 10/1980 | Rembold et al. | 74/866 |
| 4,338,666 | 7/1982 | Suzuki et al. | 74/866 |
| 4,361,060 | 11/1982 | Smyth | 74/866 |
| 4,551,802 | 11/1985 | Smyth | 74/866 |
| 4,576,065 | 3/1986 | Speranza et al. | 74/866 |
| 4,595,986 | 6/1986 | Daubenspeck et al. | 364/424.1 |
| 4,643,048 | 2/1987 | Hattori et al. | 192/0.044 |
| 4,648,290 | 3/1987 | Dunkley et al. | 74/866 |
| 4,687,083 | 8/1987 | Sotoyama et al. | 192/0.076 |
| 4,711,141 | 12/1987 | Spearanza | 192/0.076 |
| 4,733,580 | 3/1988 | Kubo et al. | 74/866 |
| 4,742,733 | 5/1988 | Schreiner | 74/866 |
| 4,753,135 | 6/1988 | Sotoyama et al. | 74/866 |

*Primary Examiner*—Parshotam S. Lall
*Assistant Examiner*—Christopher L. Makay
*Attorney, Agent, or Firm*—H. D. Gordon

[57] ABSTRACT

An improved control system and method for an automatic transmission system (10) including an automatic change gear transmission (12) driven by a throttle (26) controlled engine (14) is provided. The control system includes a processing unit (42) for receiving inputs indicating at least throttle position (THL) and vehicle speed (OS), for determining vehicle acceleration/deceleration (dOS/dt) and for processing these inputs in accordance with a program or logic rules to determine the selected engaged gear ratio and for issuing command signals to transmission system shifting mechanisms (34 and 30). The processing unit includes an operator selected (DOR) set of logic rules by which vehicle performance is maximized and the control will evaluate downshifts at assumed constant vehicle deceleration for a period of time (T) greater than the time required for a single downshift and command a downshift to the lowest gear ratio under the calculated conditions.

14 Claims, 4 Drawing Sheets

| DRIVE RATIO | RATIO |
|---|---|
| 1 | 12.70 |
| 2 | 10.60 |
| 3 | 8.87 |
| 4 | 7.34 |
| 5 | 6.12 |
| 6 | 5.11 |
| 7 | 4.27 |
| 8 | 3.53 |
| 9 | 2.98 |
| 10 | 2.49 |
| 11 | 2.08 |
| 12 | 1.72 |
| 13 | 1.44 |
| 14 | 1.20 |
| 15 | 1.00 |
| 16 | .83 |
| LOW R | 11.69 |
| HIGH R | 8.15 |

*Fig. 3*

AMT OFF-HIGHWAY DOWNSHIFT LOGIC

BACKGROUND OF THE INVENTION

1. Field of the Invention

This invention relates to vehicular automatic transmission systems providing a plurality of gear reduction ratios, such as automatic mechanical transmissions (AMT's), and to control systems therefor. In particular, the present invention relates to control systems and methods for vehicles with throttle controlled engines and automatic transmissions wherein gear selection and shift decisions are made and executed based upon measured and/or calculated parameters such as transmission output shaft or vehicle speed, transmission input shaft and/or engine speed, throttle position, calculated engine speed in a potentially engagable ratio, and the like. More particularly, the present invention relates to automatic transmission control systems of the type described above having a selectable mode of operation in which downshifting, by more than a single ratio step if required, to the lowest allowable speed will be commanded and vehicle deceleration is sensed and the lowest allowable ratio is calculated in view of the sensed deceleration.

2. Description of the Prior Art

The use of automatic transmissions of both the automatic mechanical type utilizing positive clutches and of the planetary gear type utilizing frictional clutches is well known in the prior art as are control systems therefor. Electronic control systems for automatic transmissions wherein gear selection and shift decisions are made based upon certain measured and/or calculated parameters such as vehicle speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like are known in the prior art. Examples of such automatic transmission control systems for vehicles may be seen by reference to U.S. Pat. Nos. 4,595,986; 4,361,060; 4,073,203; 4,253,348; 4,038,889; 4,226,295; 3,776,048; 4,028,929; 4,039,061; 3,974,720 and 3,942,393, all hereby incorporated by reference. Semi-automatic transmission systems wherein operator selected shifts, including skip-shifts, are, if allowable, automatically executed are known in the prior art as may be seen by reference to U.S. Pat. No. 4,648,290, the disclosure of which is hereby incorporated by reference.

Automated transmission systems having a selectable mode wherein skip downshifts, if allowable (i.e. engine speed in to be engaged ratio not greater than maximum allowable engine speed), assuming substantially constant vehicle speed, are known in the prior art as may be seen by reference to U.S. Pat. No. 4,576,065, the disclosure of which is hereby incorporated by reference.

While the above referenced automatic transmission control systems, and similar systems, are effective to control an automatic transmission by selecting a desired gear ratio which will tend to optimize the fuel economy and/or performance of the vehicle in view of the sensed parameters and then to command or allow a shift into the selected gear ratio, such control systems were not totally acceptable as the predetermined logic rules utilized to generate shift decision date such as a shift pattern or patterns (also commonly referred to as a shift point profile) or the like did not optimize vehicle performance when commanding a downshift by selecting the lowest allowable ratio assuming constant vehicle deceleration. In particular, the relatively large inertia of a heavy vehicle ascending a relatively steep off-road grade (for example, a grade of more than twenty percent (20%)) would tend to cause the vehicle to decelerate quickly and result in multiple rapid single downshifts which may be objectionable and cause further vehicle deceleration and/or stalling of the engine due to lack of power supplied to the vehicle from the engine during the out of gear portion of the shift transient.

While the system disclosed in above-mentioned U.S. Pat. No. 4,576,065 did have a mode of operation forcing allowable skip downshifts, the system did not evaluate expected vehicle deceleration and thus certain desirable/allowable skip downshifts were not performed.

SUMMARY OF THE INVENTION

In accordance with the present invention, the drawbacks of the prior art have been overcome or minimized by providing a control system and method, preferably an electronic control system, for automatic transmissions, such as automatic/semi-automatic mechanical transmissions, wherein gear selection and shift decisions are made and executed based upon measured and/or calculated parameters including current input shaft or engine speed, throttle position, output shaft or vehicle speed and/or the rate of change thereof and expected engine speed and vehicle speed at the completion of a downshift and wherein the predetermined program by which shift commands are generated has a selectable (off-highway) mode wherein downshifts by more than one ratio (i.e. "skip downshifts") will be commanded if conditions indicative of rapid vehicle deceleration are sensed.

The above is accomplished by providing an automatic transmission control system including a central processing unit (CPU) generating shift commands based upon sensed or calculated parameters such as engine speed and throttle position. The control system has a selectable performance maximizing mode of operation wherein the logic will automatically evaluate, initiate and complete a downshift through more than a single gear ratio to improve vehicle performance by selecting the lowest allowable ratio at expected vehicle speed at completion of a downshift in view of sensed vehicle deceleration. In this mode of operation, upon reaching an engine speed at which a downshift is indicated, the control will calculate/sense the rate of vehicle deceleration and the throttle position, and command initiation of a downshift to lowest ratio in which the calculated expected engine speed does not exceed a maximum allowable value (preferably related to the speed at which engine damage might occur). As engagement will only occur if the engine can synchronize the jaw clutches of the selected ratio, prior to engagement of the selected ratio, the CPU will again calculate the expected engine speed in the ratio at the then current vehicle/output shaft speed and command completion of engagement only if the calculated maximum allowable engine speed.

If a skip downshift is not allowable, a single downshift to the next lower ratio will be commanded.

Accordingly, it is an object of the present invention to provide a new and improved control system and method for automatic transmission systems which has a selectable mode of operation wherein vehicle performance is maximized by commanding downshifts to the lowest allowable ratio at an estimated vehicle speed calculated in view of expected vehicle deceleration during the shift transient.

This and other objects and advantages of the present invention will become apparent from a reading of the description of the preferred embodiment taken in connection with the attached drawings.

BRIEF DESCRIPTION OF THE DRAWINGS

FIG. 3 table illustrating the ratio of input shaft speed to outshaft shaft speed of a typical automatic mechanical transmission in the various drive ratios thereof.

DESCRIPTION OF THE PREFERRED EMBODIMENT

Figure 1:
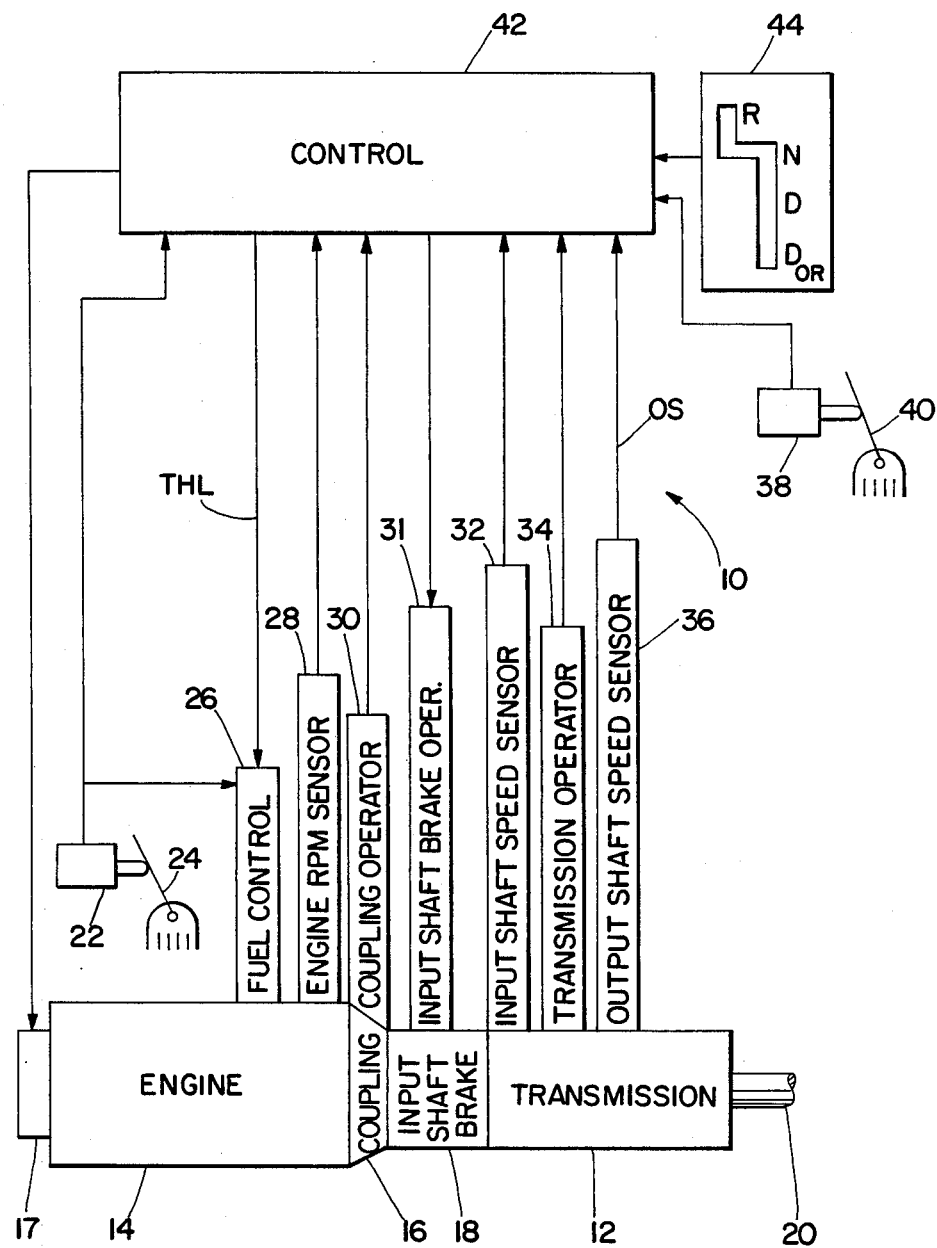
FIG. 1 is a schematic illustration of the components and interconnections of the automatic mechanical transmission control system of the present invention.

FIG. 1 schematically illustrates an automatic mechanical transmission system 10 including an automatic multi-speed compound change gear transmission 12 driven by a fuel controlled engine 14, such as a well known diesel engine, through a coupling such as torque converter and/or master clutch 16. An engine brake such as an exhaust brake 17 for retarding the rotational speed engine 14 and/or an input shaft brake 18 which is effective to apply a retarding force to the transmission input shaft upon disengagement of coupling 16 may be provided as is known in the prior art. The output of automatic transmission 12 is output shaft 20 which is adapted for driving connection to an appropriate vehicle component such as the differential of a drive axle, a transfer case, or the like as is well known in the prior art.

The above mentioned power train components are acted upon and monitored by several devices, each of which will be discussed below. These devices include a throttle pedal position or throttle opening monitor assembly 22 which senses the position of the operator controlled throttle device 24, a fuel control device 26 for controlling the amount of fuel to be supplied to engine 14, and engine speed sensor 28 which senses the rotational speed of the engine, a coupling operator 30 which engages and disengages coupling clutch 16 and which also supplies information as to the status of the coupling, an input brake operator 31, a transmission input shaft speed sensor 32, a transmission operator 34 which is effective to shift the transmission 12 into a selected gear ratio and to provide a signal indicative of the gear neutral condition and/or the currently engaged gear ratio, and a transmission output shaft speed sensor 36. A vehicle brake monitor 38 senses actuation of the vehicle brake pedal 40.

It is understood that clutch 16 could be replaced by a hydromechanical device, such as a torque converter, and that such torque converter could be equipped with by-pass, lock-up and/or disconnect devices.

The above mentioned devices supply information to and/or accept commands from a central processing unit or control 42. The central processing unit 42 may include analog and/or digital electronic calculation and logic circuitry, the specific configuration and structure of which forms no part of the present invention. The central processing unit also receives information from a shift control assembly 44 by which the vehicle operator may select a reverse (R), neutral (N), on-highway forward drive (D) or off-road forward drive ($D_{OR}$) mode of operation of the vehicle. An electrical power source (not shown) and/or a source of pressurized fluid (not shown) provides electrical and/or pneumatic power to the various sensing, operating and/or processing units. Drive train components and controls therefor of the type described above are known in the prior art and may be appreciated in greater detail by reference to above-mentioned U.S. Pat. Nos. 4,595,986; 4,576,065; 4,445,393; 4,361,060; 3,776,048; 4,038,889 and 4,226,295.

Sensors 22, 28, 32, 36, 38 and 40 may be of any known type or construction for generating analog or digital signals proportional to the parameter monitored thereby. Similarly, operators 17, 18, 26, 30 and 34 may be of any known electric, pneumatic or electro-pneumatic type for executing operations in response to command signals from the central processing unit 42 and/or for providing input signals thereto. Fuel control 26 will normally supply fuel to engine 14 in accordance with the operator setting of throttle pedal 24 but may supply a lessor (fuel dipped) or greater (fuel boost) amount of fuel in accordance with commands from the central processing unit 42.

Clutch operator 30 is preferably controlled by the central processing unit 42 and may engage and/or disengage master clutch 16 as described in above-mentioned U.S. Pat. No. 4,081,065. Of course, operator 30 could also be an operator for torque converter by-pass, lock-up and/or disconnect devices as illustrated in allowable U.S. Ser. No. 006,303 filed Jan. 15, 1987, the disclosure of which is hereby incorporated by reference. Transmission 12 may include synchronizing means, such as an accelerator and/or a brake mechanism as described in U.S. Pat. Nos. 3,478,851 and 4,676,115, the disclosures of both of which are hereby incorporated by reference. Transmission 12 is preferably, but not necessarily of the twin countershaft type as is seen in U.S. Pat. Nos. 3,105,395 or 4,648,290, the disclosures of which are incorporated by reference.

In addition to direct inputs, the central processing unit may be provided with circuitry for differentiating the input signal from sensor 28 to provide a calculated signal indicative of the rate of acceleration of the engine, means to compare the input signals from sensor 32 and 36 to calculate a current engaged gear ratio, circuit means to compare the current engaged gear ratio with the signal from sensor 36 to provide a calculated engine speed, means to sense full throttle, and means to calculate an expected engine speed in a given engaged ratio and at a calculated or sensed output shaft speed.

In the automatic mechanical transmission system illustrated in FIG. 1, a purpose of the central processing unit is to select, in accordance with predetermined logic rules and current or stored parameters, the optimum gear ratio at which the transmission should be operating and, if necessary, to command a gear change, or shift, into the selected optimal gear ratio based upon the current and/or stored information. FIG. 3 illustrates the ratio of the input shaft speed to the output shaft speed in a 16-forward speed and 2-reverse drive ratio type of transmission typically utilized with heavy duty vehicles and suitable for use in the automatic mechanical transmission system 10 illustrated in FIG. 1. Although not necessary, it may be seen that the steps or splits between forward ratios are approximately twenty percent (20%).

As indicated above, one of the principle functions of the control unit 42 of the automated mechanical transmission system is to make decisions as to the proper gear ratio that should be selected and engaged in transmission 12 based upon driver demands and vehicle operating conditions. Ideally, transmission system 10 utilizes an electronic control unit 42 preferably microprocessor based, which can be programmed to enhance specific vehicle characteristics.

Figure 2:
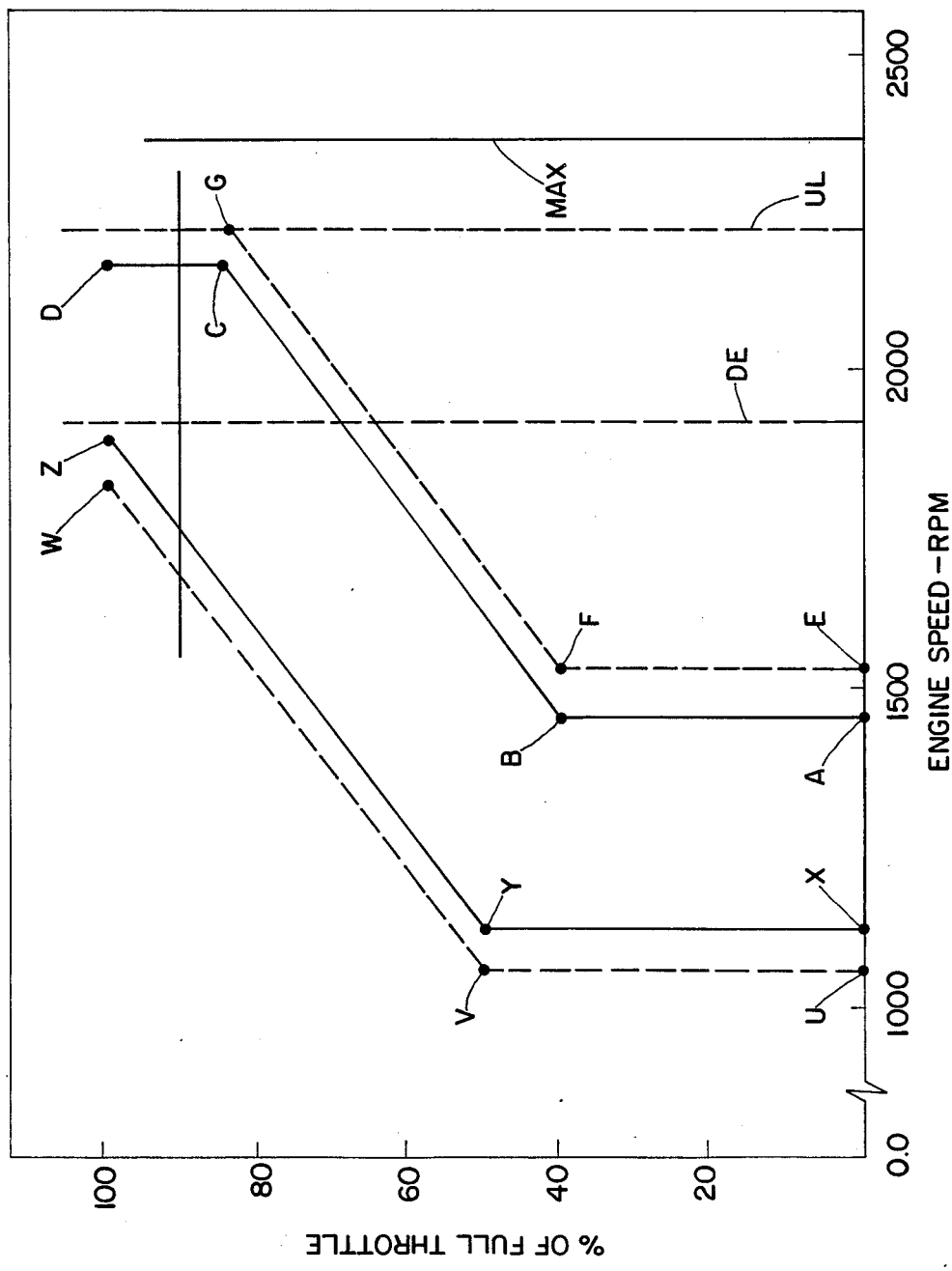
FIG. 2 is a graph of engine speed versus throttle position illustrating shift patterns, or shift point profiles, of the type generated/calculated by control systems of automated mechanical transmissions.

One method by which shift decisions are made is for the central processing unit program or logic rules to generate shift patterns, or shift point profiles, as seen in FIG. 2. The shift point profiles generated by the central processing unit will determine if the transmission should remain in the currently engaged gear ratio, should be upshifted to at least the next highest gear ratio or should be downshifted to at least the next lower gear ratio. The shift point profiles are determined by a predetermined program acting upon current or stored information and are usually selected to provide a compromise between operation at the most fuel efficient possible gear ratio and operation in a gear ratio providing optimal performance and/or comfort characteristics of the vehicle. Shift point profiles illustrated in FIG. 2 are a function of throttle position, expressed as a percentage of maximum throttling position, and of engine speed. The engine speed may be directly sensed or, preferably, is a calculated engine speed (i.e. based upon output shaft speed and engaged gear ratio) which will not vary during a shift transient as is known in the prior art.

As used herein a "lower gear ratio" or "lower drive ratio" will refer to a gear or drive ratio having a higher ratio of input shaft speed to output shaft speed. For example, ninth (9th) gear is lower than tenth (10th) gear and the shift from tenth gear to ninth gear is a downshift. Similarly, a shift directly from tenth gear to eighth gear is a skip downshift wherein one ratio (i.e. 9th speed) is skipped. A shift directly from tenth speed to seventh speed is a skip downshift wherein two ratio steps are skipped.

The control 42 has at least two selectable operating modes including an over-the-highway mode (D) and an off-road ($D_{OR}$) mode either of which may be selected by the operator. In the off-road mode, performance is to maximize at the probable expense of fuel economy and/or vehicle comfort. The shift point profile illustrated in FIG. 2 are based upon transmission control system having both an on-highway and off-the-road mode of operation.

Both the on-highway (A-B-C-D and X-Y-Z) and off-road (E-F-G and U-V-W) shift profiles provide the basis for shifting the transmission 12 as a function of speed modulated by the driver controlled throttle position. Both sets of profiles are primarily derived the characteristics of the engine including the effects of all engine driven auxiliaries. The engine speed signal, shown in terms of engine RPM, is preferably derived by multiplying the transmission output shaft signal by the numeric value of the gear ratio of the drive ratio currently selected by the control electronics. Throttle position is shown as a percentage of full throttle from zero percent (0%) to one hundred percent (100%).

The shift profiles include an on-highway upshift line A-B-C-D, an on-highway downshift line X-Y-Z, an off-road upshift line E-F-G and an off-road downshift line U-V-W. Briefly, for off-road operating conditions within the space bounded by downshift line U-V-W and upshift line E-F-G, no gear change is required, for operating conditions at or to the right of upshift line E-F-G an upshift to the next highest gear ratio is required and for operating conditions within the area at or to the left of downshift line U-V-W, a downshift to at least the next lowest gear ratio is required. It is understood, of course, that a single shift point profile may be utilized for all gear ratios of a transmission or a separate shift profile may be generated for each currently engaged gear ratio. Generally, the greater the difference in ratio splits between the gears, the greater the desirability of separate shift point profiles for each currently engaged gear ratio.

Other sensed or calculated monitored speeds, such as input shaft speed, output shaft speed, vehicle speed or the like may be substituted for engine speed in the shift point profiles illustrated in FIG. 2. Also, upshift and downshift lines are preferably not static but are dynamic. Dynamically moving shift point profile lines are known, and are discussed in greater detail in above-mentioned U.S. Pat. No. 4,361,060. Typically, the shift point lines are moved in response to current and/or stored information such as direction of a last shift, acceleration of the vehicle, acceleration of the engine, rate of change of throttle position, operation of the vehicle brake or the like.

It is important to understand that the shift point profiles are dependent upon the throttle position as well as the engine speed. Other than selecting a reverse, neutral or a forward drive mode of operation of the vehicle by manipulation of selector 44, the operator's only input to the transmission is his manipulation of the throttle pedal for other fuel control as the case may be. Accordingly, by setting shift profiles and modifying same in partial response to throttle position, the operator's desires are accounted for at a central processing unit 42 in deciding the optimal gear ratio at which the transmission 12 is to operate.

The shift point profiles also include an upshift limit (UL) at which the transmission must be upshifted to prevent impending speed related damage to the engine and a downshift enable limit (DE) above which the transmission must not be downshifted to prevent speed related damage to the engine. The upshift limit (UL) and downshift enable (DE) are not functions of throttle position. Line MAX indicates the engine speed in which engine damage is expected. Referring to the off-road mode, upshifts occur as the operating point moves to the right of the E-F-G or UL profiles. Downshifts occur if the operating point moves to the left of the DE and the U-V-W profiles. All of these profiles, shown in the normal position, are subject to movement and response to various signals as discussed in greater detail in above-mentioned U.S. Pat. No. 4,361,060.

With a step change transmission, the ratio of engine speeds between any two gears is fixed by the ratio step or split (ratio of gear ratios). With profiles located as previously described, each upshift would lead to an operating point located on or near the downshift lines for the next high gear and vice versa. Hunting between gears would be inevitable. Some additional separation between the upshift and downshift profiles is desirable and acceptable; however, sufficient separation to eliminate hunting can result in an undesirable reduction in fuel economy. To overcome this problem, the control moves the shift profiles as a consequence of a shift. After an upshift, the downshift profile is moved towards lower engine speeds; after a downshift, the upshift profiles are moved towards higher engine speeds.

Preferably, as indicated above, the engine speed is a calculated rather than an actual engine speed, corresponding to the engine speed at drive train lock up conditions, which is determined by multiplying the output shaft speed by the appropriate gear ratio. The use of a calculate rather than an actual engine speed is preferred as actual engine speeds will vary during shift transients and the like.

While operation of the transmission in accordance with the above procedure is satisfactory for most normal on-highway conditions, in conditions wherein maximum vehicle performance is required, such as when a severe grade must be ascended by a heavily loaded vehicle, the vehicle performance in the above-described single downshift operation is often unsatisfactory. In cases of a steep grade, the inertia of vehicle may cause the vehicle to decelerate very rapidly, while the torque requirement to move and/or accelerate the vehicle may increase rapidly. Under such conditions, and other conditions wherein maximum vehicle acceleration and/or engine torque are required, a shift logic which downshifts by a single step only and/or which is based upon assumed constant vehicle speed and/or which does not command downshifts to the lowest allowable gear speed may not provide acceptable operation as rapid repeated downshifts may be required which tend to be objectionable, the ratio of time in gear to time out of gear is lower than desired and/or the allowable ratio providing maximum torque may not be selected.

To overcome this drawback (in at least the selectable off-road/performance modes of operation) the improved control system of the present invention operates on a program or procedure by which, upon sensing downshift conditions, a series of downshifts of N (N equaling a whole number greater than one, preferably two or three) steps is each evaluated under the assumption of continuing vehicle acceleration for a time period T, and a downshift to the lowest allowable ratio is commanded.

Upon sensing conditions indicative of a downshift in the off-road mode ($D_{OR}$), and if the fuel being supplied to the engine (THL) is greater than a reference value ($REF_1$), usually about fifty-percent (50%) of maximum fuel to the engine, the logic will calculate an expected vehicle speed at the completion of the downshift. The expected vehicle speed is current vehicle speed subject to the assumption of constant deceleration for a period of time T where T is a time period longer than the time period required to complete a single downshift but no greater than the time period required to complete a multiple downshift.

Based upon the expected vehicle speed, the logic will calculate the expected engine speed at each of the N lower gear ratios until at least the expected engine speed in the Nth lower ratio exceeds a maximum reference value, $REF_2$, equal to about the maximum allowable engine speed (MAX). A downshift will then be commanded to the ratio having the highest expected engine speed not exceeding the reference value $REF_2$.

The above procedure provides for a performance mode which is responsive to vehicle deceleration and which will command downshifts to the lowest allowable ratio in view of sensed vehicle deceleration.

Preferably, just prior to commanding a downshift to the lowest allowable gear ratio, the central processing unit will evaluate the expected engine speed (at the then current vehicle speed less a predetermined deceleration factor multiplied by the expected shift transient period) at completion of the shift and command the skip downshift only if that calculated expected engine speed does not exceed the engine speed at which upshifts are commanded from the lowest allowable ratio at current throttle position, i.e. if not to the right of UL or EFG in FIG. 2. If the calculated expected engine speed does exceed the upshift speed, the control will command a downshift to the lowest acceptable ratio from the previously engaged ratio.

Figure 4:
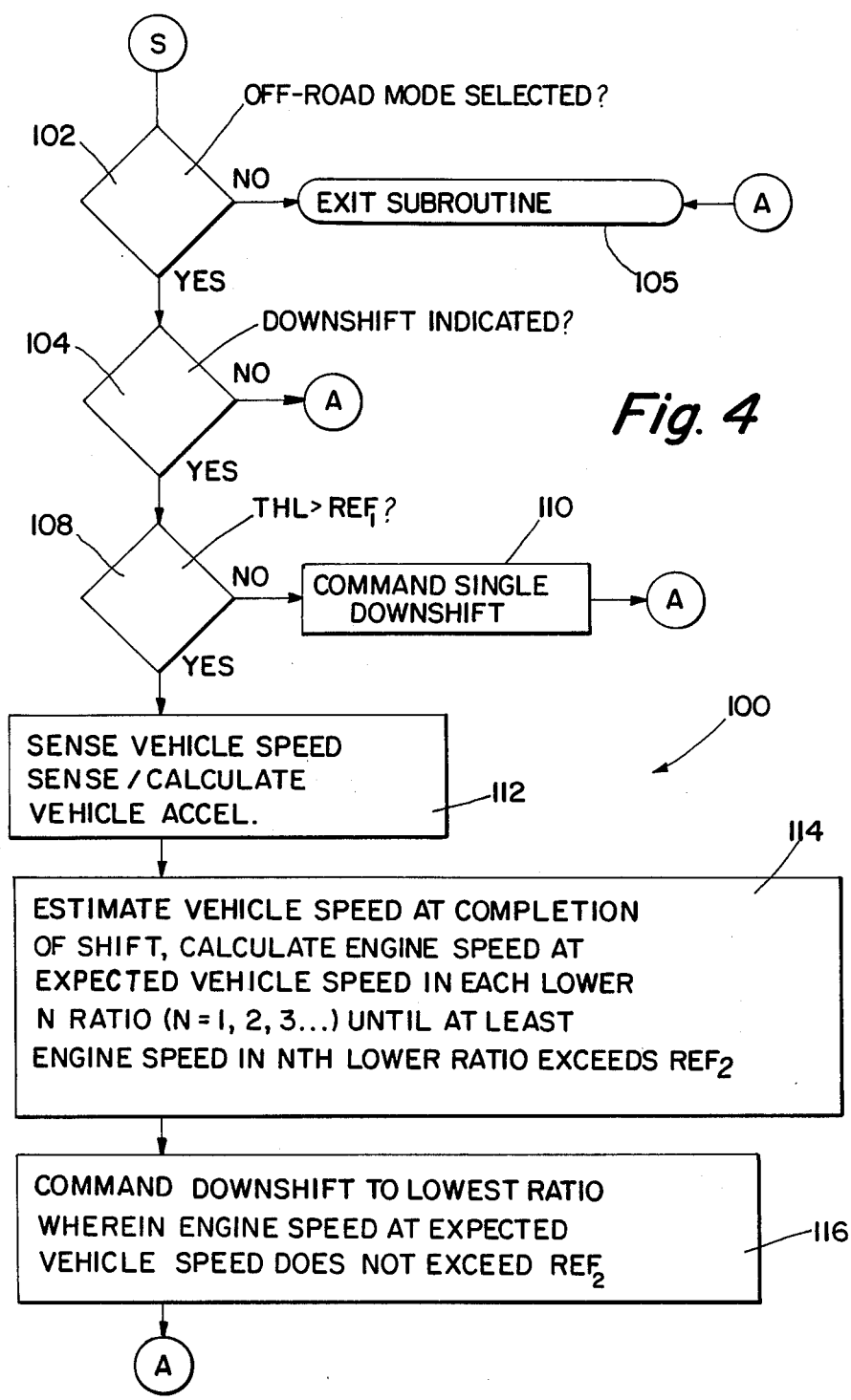
FIG. 4 is a symbolic illustration, in the form of a flow chart, illustrating the preferred manner of practicing the present invention.

Symbolic illustration of the present invention, in flow chart format, may be seen by reference to FIG. 4. Starting at point S, the off-road downshift logic subroutine 100 determines at 102 if the off-road mode ($D_{OR}$) is selected and at 104 if a downshift is required, and, if not, the subroutine is exited at 106. Alternatively, the subroutine can be entered only upon a logic determination that off-road is selected and/or a downshift is required.

At 108 it is determined if THL is greater than the reference value $REF_1$. If not true, a single downshift is commanded at 110. If THL is greater than the $REF_1$ value, at 112 the value of vehicle deceleration, or a representative value such and dOS/dt is calculated.

At 114 the expected vehicle speed, assuming constant deceleration for a period of time T is calculated as is expected engine speed in a series of N lower ratios until at least the expected engine speed in the Nth lower ratio exceeds a maximum allowable value $REF_2$. At 116 a downshift to the lowest gear ratio wherein expected engine speed does not exceed $REF_2$ is commanded. The subroutine is then exited.

Although the present invention has been set forth with a certain degree of particularity, it is understood that various modifications are possible without departing from the spirit and scope of the invention as hereinafter claimed.

I claim:

1. An automated transmission system for vehicles having a fuel-controlled engine having a maximum allowable engine speed, a throttle controlling means for controlling the amount of fuel supplied to the engine and a transmission having a plurality of gear ratio combinations selectively engagable between a transmission input shaft and a transmission output shaft, said transmission input shaft being operatively connected to said engine by a coupling device, said transmission system including an information processing unit having means for receiving a plurality of input signals including (1) an input signal indicative of the position of said throttle controlling means, and (2) an input signal indicative of the speed of said vehicle, said processing unit including means for processing said input signals in accordance with predetermined logic rules to select a desirable gear ratio for a given combination of input signals and for generating command output signals whereby said transmission system is operated in accordance with said predetermined logic rules, and means associated with said transmission effective to actuate said transmission to effect engagement of one of said gear ratio combinations in response to said output signals from said processing unit;

said processing unit having means for processing said input signals to provide a value indicative of the acceleration of the vehicle, and to calculate an expected engine speed value indicative of the expected rotational speed of the engine at selected vehicle speeds in selected gear ratio combinations; and said predetermined logic rules having an operator selectable mode of operation wherein, upon sensing conditions at which a downshift is normally required, said processing unit is effective:

to compare the position of the throttle controlling means to a first reference value and if the position of the throttle controlling means is greater than said first reference value to calculate expected vehicle speed at completion of a downshift assuming constant vehicle acceleration for a period of time greater than the time required to complete a single downshift from the currently engaged gear ratio;

to calculate expected engine speeds in each of the Nth lower gear ratios at expected vehicle speed, where N is an integral greater than one, until at least the expected engine speed in the Nth lower gear ratio is greater than a second reference value; and to command a downshift directly into the lowest gear ratio having an expected engine speed less than said second reference value.

2. The system of claim 1 wherein said second reference value is substantially equal to said maximum allowable engine speed.

3. The system of claim 1 wherein said period of time is less than the time required to complete a single skip downshift from the currently engaged gear ratio.

4. The system of claim 2 wherein said period of time is less than the time required to complete a single skip downshift from the currently engaged gear ratio.

5. The system of claim 1 wherein said first reference is greater than 30% of maximum throttle setting.

6. The system of claim 2 wherein said first reference is greater than 30% of maximum throttle setting.

7. The system of claim 4 wherein said first reference is greater than 30% of maximum throttle setting.

8. A method for controlling an automated transmission system for vehicles having a fuel-controlled engine having a maximum engine speed, a throttle controlling means for controlling the amount of fuel supplied to the engine and a transmission having a plurality of gear ratio combinations selectively engagable between a transmission input shaft and a transmission output shaft, said transmission input shaft being operatively connected to said engine by a coupling device, said transmission system comprising, an information processing unit having means for receiving a plurality of input signals including (1) an input signal indicative of the position of said throttle controlling means and (2) an input signal indicative of the speed of said vehicle, said processing unit including means for processing said input signals in accordance with a program to provide a predetermined selected gear ratio for a given combination of input signals and for generating command output signals whereby said transmission system is operated in accordance with said program, and means associated with said transmission effective to actuate said transmission to effect engagement of one of said gear ratio combinations in response to said output signals from said processing unit, the method including sensing vehicle conditions indicative of the desirability of a downshift and determining a value indicative of vehicle acceleration, and calculating an expected engine speed value indicative of the expected rotational speed of the engine at selected vehicle speeds in selected gear ratio combinations, said method comprising:

sensing operator selection of a performance enhancing mode of operation;

sensing conditions indicative of a desirable downshift;

comparing throttle controlling means position to a predetermined first reference value and the value indicative of vehicle deceleration to a second reference value and, if throttle position is greater than said first reference value and the value indicative of vehicle acceleration is less than said second reference value;

calculating expected vehicle speed at completion of a downshift assuming constant vehicle acceleration for a period of time greater than the time required to complete a single downshift from the currently engaged gear ratio;

calculating expected engine speeds at each of the Nth lower gear ratios, at expected vehicle speed, where N is an integral greater than one until at least the expected engine speed in the Nth lower gear ratio is greater than said maximum allowable engine speed; and commanding a downshift directly into the lowest gear ratio having an expected engine speed less than said maximum allowable engine speed.

9. The method of claim 8 wherein said period of time is less than the time required to complete a single skip downshift from the currently engaged gear ratio.

10. The method of claim 8 wherein said first reference value is greater than 30% of maximum throttle control setting.

11. The method of claim 9 wherein said first reference value is greater than 40% of maximum throttle control setting.

12. The method of claim 8 wherein said first reference value corresponds to at least fifty percent of full throttle.

13. The method of claim 9 wherein said first reference value corresponds to at least fifty percent of full throttle.

14. The method of claim 11 wherein said first reference value corresponds to at least fifty percent of full throttle.

* * * * *